US012652267B2

(12) United States Patent
Maki et al.

(10) Patent No.: US 12,652,267 B2
(45) Date of Patent: Jun. 9, 2026

(54) INFORMATION PROCESSING APPARATUS, METHOD, AND NON-TRANSITORY COMPUTER-READABLE STORAGE MEDIUM STORING PROGRAM THAT ACQUIRES NON-RANDOMIZED IDENTIFICATION INFORMATION FROM A COMMUNICATION APPARATUS WHEN A RANDOMIZING FUNCTION IS ENABLED

(71) Applicant: CANON KABUSHIKI KAISHA, Tokyo (JP)

(72) Inventors: Shunsuke Maki, Tokyo (JP); Shodai Yano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 129 days.

(21) Appl. No.: 18/648,563

(22) Filed: Apr. 29, 2024

(65) Prior Publication Data
US 2024/0380729 A1 Nov. 14, 2024

(30) Foreign Application Priority Data
May 11, 2023 (JP) ................................. 2023-078696

(51) Int. Cl.
*G06F 15/16* (2006.01)
*H04L 9/00* (2022.01)
(Continued)

(52) U.S. Cl.
CPC ........ *H04L 61/5038* (2022.05); *H04L 9/0866* (2013.01); *H04L 9/50* (2022.05)

(58) Field of Classification Search
CPC ..... H04L 61/5038; H04L 9/0866; H04L 9/50; H04L 61/5092; H04L 2101/622; H04L 63/0421; H04W 12/02
See application file for complete search history.

(56) References Cited

U.S. PATENT DOCUMENTS 10,764,239 B2 * 9/2020 Saha ..................... H04L 45/586
12,034,695 B2 * 7/2024 Vegas ................. H04L 61/5038
(Continued)

FOREIGN PATENT DOCUMENTS

| | | |
|---|---|---|
| JP | 2017525287 A | 8/2017 |
| WO | 2016015573 A1 | 2/2016 |

*Primary Examiner* — Razu A Miah
(74) *Attorney, Agent, or Firm* — Venable LLP

(57) ABSTRACT
An information processing apparatus acquires predetermined information from a communication apparatus and determines whether the acquired predetermined information is information corresponding to enabling of a predetermined function of randomizing identification information of the communication apparatus in the communication apparatus. If it is determined that the acquired predetermined information is information corresponding to the enabling of the predetermined function, the information processing apparatus acquires identification information that is not randomized by the predetermined function from the communication apparatus that has transmitted the predetermined information to the information processing apparatus. The information processing apparatus then executes processing based on the acquired identification information that is not randomized by the predetermined function.

19 Claims, 7 Drawing Sheets

(51) Int. Cl.
    *H04L 9/08*           (2006.01)
    *H04L 61/5038*     (2022.01)

(56)               References Cited

U.S. PATENT DOCUMENTS

| | | | |
|---|---|---|---|
| 2012/0257753 A1* | 10/2012 | Ochikubo | H04W 12/02 |
| | | | 380/270 |
| 2014/0032790 A1* | 1/2014 | Sueyoshi | G06F 13/10 |
| | | | 710/14 |
| 2014/0059214 A1* | 2/2014 | Imamura | H04L 45/70 |
| | | | 709/224 |
| 2016/0316448 A1* | 10/2016 | Tawara | H04W 8/26 |
| 2017/0013445 A1* | 1/2017 | Raman | H04L 63/1458 |
| 2017/0054715 A1* | 2/2017 | Takeuchi | H04W 12/041 |
| 2017/0134615 A1* | 5/2017 | Onose | H04N 1/4413 |
| 2020/0013170 A1* | 1/2020 | Takamatsu | G06T 7/13 |
| 2022/0198561 A1* | 6/2022 | Muto | G06Q 40/04 |
| 2023/0198943 A1* | 6/2023 | de la Oliva | H04L 61/5038 |
| | | | 709/220 |

* cited by examiner

F I G. 1
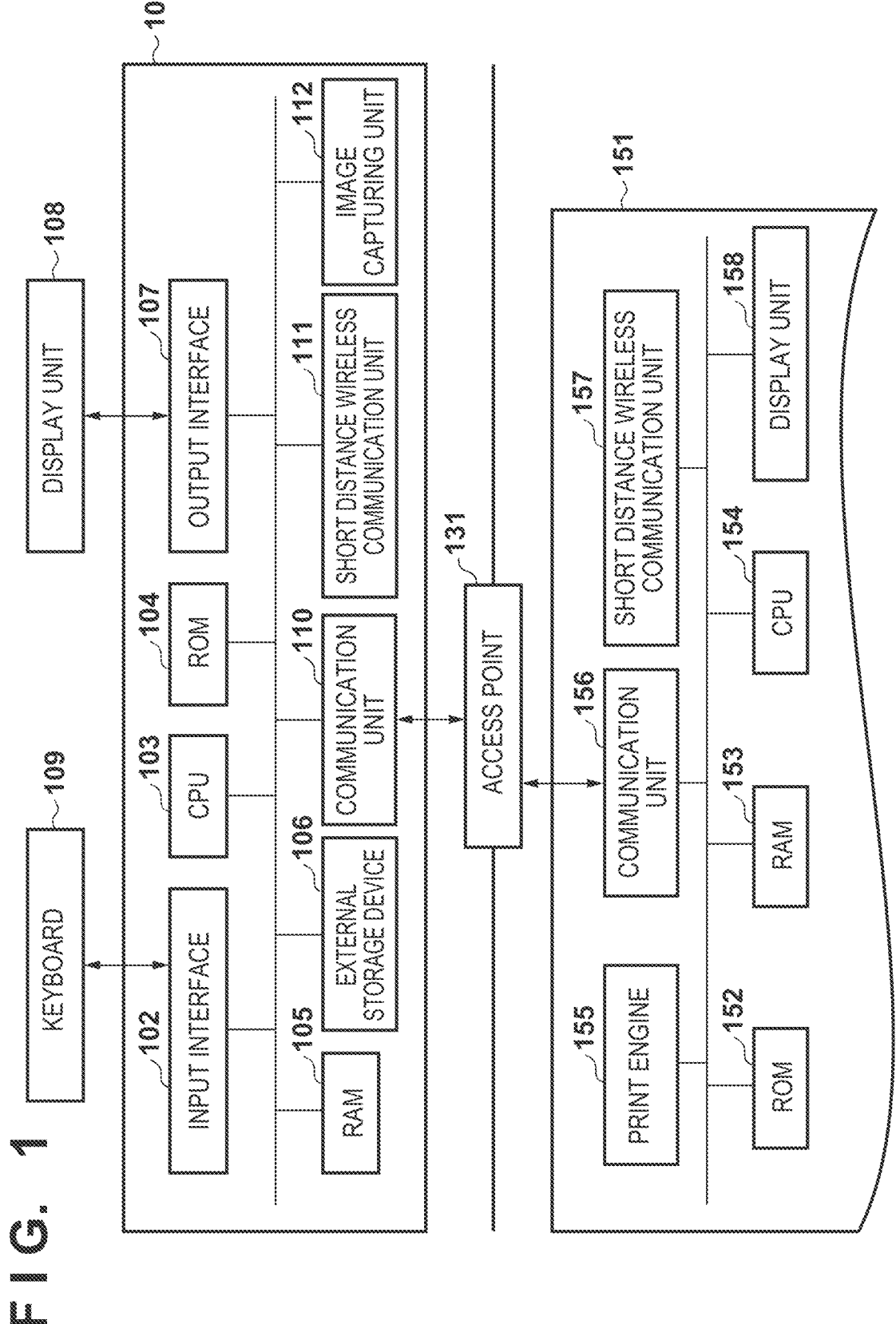

FIG. 2

PRINTER MANAGEMENT INFORMATION LIST:

| MAC ADDRESS | MODEL NAME | INSTALLATION PLACE | STATE | IP ADDRESS | PORT NAME | FIRMWARE VERSION | CONNECTION SSID |
|---|---|---|---|---|---|---|---|
| XXXX | Printer1 | AAA | READY TO PRINT | x.x.x.x | Port1 | 1.02 | SSID1 |
| YYYY | Printer2 | BBB | OFFLINE | x.x.x.x | Port2 | 1.10 | SSID1 |
| ZZZZ | Printer1 | CCC | ERROR | x.x.x.x | Port3 | 1.00 | SSID2 |

UPDATE

201

202

203

204

F I G. 5
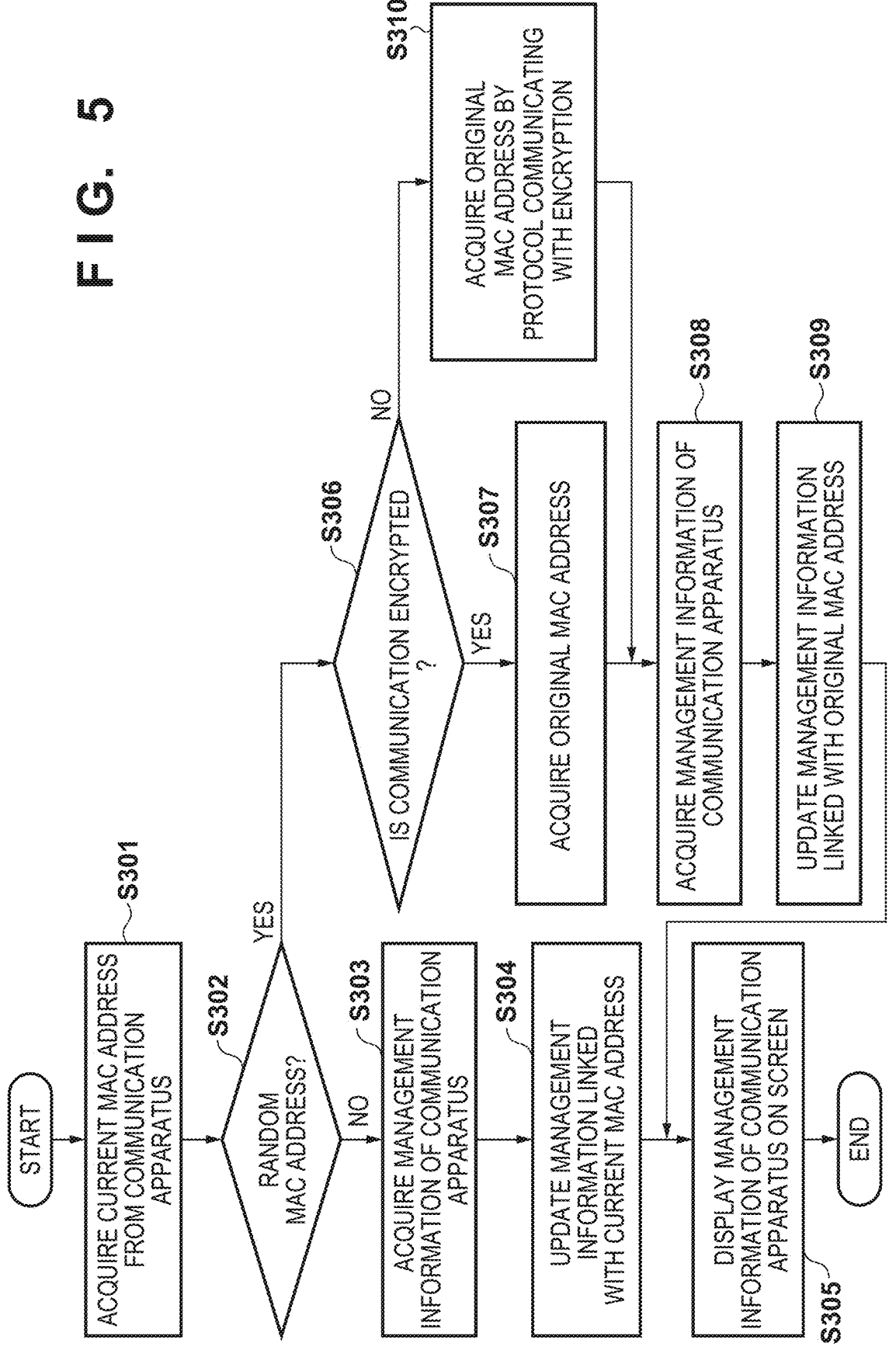

INFORMATION PROCESSING APPARATUS, METHOD, AND NON-TRANSITORY COMPUTER-READABLE STORAGE MEDIUM STORING PROGRAM THAT ACQUIRES NON-RANDOMIZED IDENTIFICATION INFORMATION FROM A COMMUNICATION APPARATUS WHEN A RANDOMIZING FUNCTION IS ENABLED

BACKGROUND OF THE INVENTION

Field of the Invention

The present invention relates to an information processing apparatus, a method, and a non-transitory computer-readable storage medium storing a program.

Description of the Related Art

There is provided a system in which an apparatus (to be also referred to as an information processing apparatus hereinafter) such as a personal computer or a smartphone is connected to a network via a wireless LAN to communicate information with a processing apparatus (to be also referred to as a communication apparatus hereinafter) such as a printer or a scanner.

In recent years, along with an increase in co-working space and public wireless LANs such as free Wi-Fi, opportunities for performing wireless LAN communication in places other than the home and office have increased. However, wireless LAN communication used in various places may be observed by the third party to track a user. To avoid such a situation and protect user privacy, a technique of periodically changing a MAC address has been introduced. The technique of periodically changing a MAC address is also called MAC address randomization.

According to Japanese Patent Laid-Open No. 2017-525287, the first wireless terminal transmits, to the second wireless terminal, an identifier generated from the stored MAC address of the second wireless terminal. The second wireless terminal verifies the received identifier, and if the identifier is correct, transmits the current MAC address to the first wireless terminal. Then, the first wireless terminal establishes connection to the second wireless terminal by the received MAC address.

SUMMARY OF THE INVENTION

The present invention provides an information processing apparatus that appropriately manages information of a communication apparatus even in a case where the identification information of the communication apparatus is randomized, a method, and a non-transitory computer-readable storage medium storing a program.

The present invention in one aspect provides a method for controlling an information processing apparatus, the method comprising: acquiring predetermined information from a communication apparatus; acquiring, in a case where the acquired predetermined information is information corresponding to enabling of a predetermined function of randomizing identification information of the communication apparatus in the communication apparatus, identification information that is not randomized by the predetermined function from the communication apparatus that has transmitted the predetermined information to the information processing apparatus; and executing processing based on the acquired identification information that is not randomized by the predetermined function.

According to the present invention, even in a case where the identification information of a communication apparatus is randomized, it is possible to appropriately manage the information of the communication apparatus.

Further features of the present invention will become apparent from the following description of exemplary embodiments with reference to the attached drawings.

BRIEF DESCRIPTION OF THE DRAWINGS

FIG. 1 is a block diagram showing the arrangement of a system including an information processing apparatus and a communication apparatus;

FIG. 2 is a view showing the user interface screen of a printer management application;

FIG. 5 is a flowchart illustrating processing executed by an information processing apparatus;

DESCRIPTION OF THE EMBODIMENTS

Figure 3:
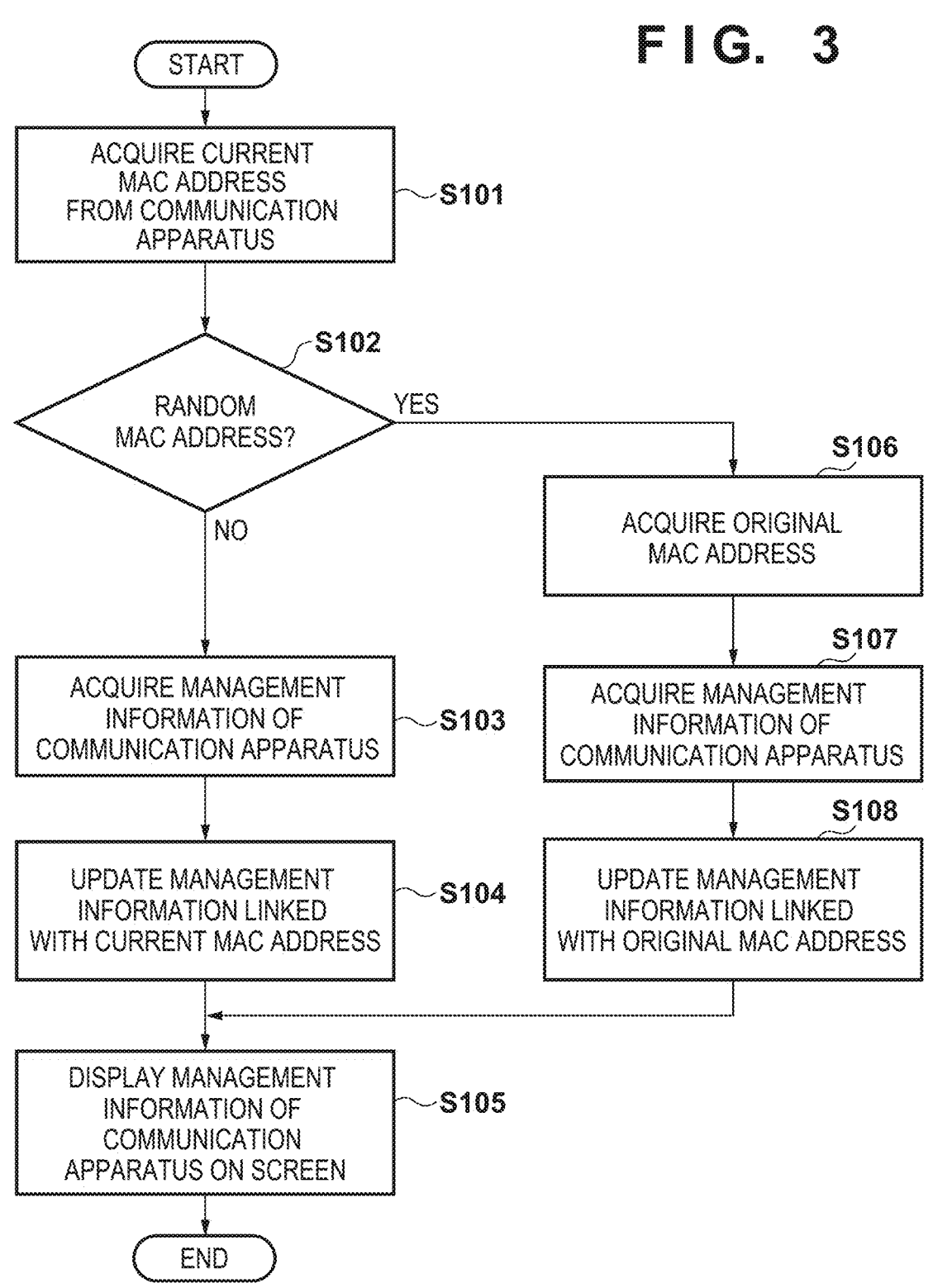
FIG. 3 is a flowchart illustrating processing executed by the information processing apparatus.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted. Information of a communication apparatus may be managed based on identification information of the communication apparatus. If the identification information of the communication apparatus is randomized, it is impossible to appropriately manage the information of the communication apparatus.

According to the present disclosure, even in a case where the identification information of the communication apparatus is randomized, it is possible to appropriately manage the information of the communication apparatus.

First Embodiment

An information processing apparatus 101 and a communication apparatus 151 included in a communication system according to this embodiment will be described. In this embodiment, a smartphone is exemplified as the information processing apparatus 101 but the present invention is not limited to this. For example, as the information processing apparatus 101, various kinds of apparatuses such as a portable terminal, a Personal Computer (PC), a tablet terminal, a Personal Digital Assistant (PDA), and a digital camera are applicable. Furthermore, a printer is exemplified as the communication apparatus 151 but the present invention is not limited to this, and various kinds of apparatuses are applicable as long as they can perform wireless communication with the information processing apparatus 101.

For example, concerning a printer, an inkjet printer, a full-color laser beam printer, a monochrome printer, and the like are applicable. Furthermore, not only a printer but also a copying machine, a facsimile apparatus, a portable terminal, a smartphone, a laptop, a tablet terminal, a PDA, a digital camera, a music playback device, a television, a smart speaker, and the like are applicable. In addition, a multi-function peripheral having a plurality of functions such as a copying function, a FAX function, and a print function is applicable.

First, components of the information processing apparatus 101 of this embodiment and the communication apparatus 151 which can communicated with the information processing apparatus 101 of this embodiment will be described with reference to a block diagram shown in FIG. 1. Although this embodiment will exemplify the following components, the present invention is not limited to functions shown in FIG. 1. Apparatuses that are applicable to the information processing apparatus 101 and the communication apparatus 151 can appropriately include components corresponding to executable functions.

The information processing apparatus 101 includes an input interface 102, a CPU 103, a ROM 104, a RAM 105, an external storage device 106, an output interface 107, a display unit 108, a communication unit 110, a short distance wireless communication unit 111, and an image capturing unit 112. The CPU 103, the ROM 104, the RAM 105, and the like form a computer of the information processing apparatus 101 for executing a program.

The input interface 102 is an interface for accepting data input and instruction operations from the user when an operation unit such as a keyboard 109 is operated. Note that the operation unit may include a physical keyboard and physical buttons, or may include a software keyboard and software buttons displayed on the display unit 108. That is, the input interface 102 may accept input from the user via the display unit 108.

The CPU 103 is a system control unit and controls the whole information processing apparatus 101 such as execution of an application program. The ROM 104 stores permanent data such as control programs to be executed by the CPU 103, data tables, and an embedded operating system (to be referred to as an OS hereinafter) program. In this embodiment, the control programs stored in the ROM 104 perform software execution control such as scheduling, task switch, and interrupt processing under the management of the embedded OS stored in the ROM 104.

The RAM 105 is formed by a Static Random Access Memory (SRAM) or the like, which needs a backup power supply. Note that the RAM 105 can store important data such as program control variables without volatilization because the data are held by a primary battery (not shown) for data backup. In addition, a memory area for storing setting information of the information processing apparatus 101, management data of the information processing apparatus 101, and the like is also provided in the RAM 105. Furthermore, the RAM 105 is also used as the main memory and the work memory of the CPU 103.

The external storage device 106 stores an application program configured to execute a network setup of the communication apparatus 151, a printer management application, a print information generation program that generates print information interpretable by the communication apparatus 151, and the like. Each program is stored in the external storage device 106 by being installed from an external server (not shown) by, for example, Internet communication via the communication unit 110. A service registration application is an application program configured to transmit information acquired from the communication apparatus 151, personal information of the user acquired by the information processing apparatus 101, and the like to a service management server (not shown). The application program (setting application) configured to execute a network setup of the communication apparatus 151 is an application program configured to set an access point as the connection destination of the communication apparatus 151. The printer management application is an application configured to manage information of the printer. Note that the service registration application, the setting application, the printer management application, and the print information generation program (print application) may be formed as one application.

The output interface 107 is an interface configured to perform control for causing the display unit 108 to display data or make a notification concerning the state of the information processing apparatus 101. The display unit 108 is formed by a Light-Emitting Diode (LED), a Liquid Crystal Display (LCD), or the like and displays data or makes a notification concerning the state of the information processing apparatus 101. The image capturing unit 112 is, for example, a camera that captures the outside.

The communication unit 110 is a component connected to the apparatus such as the communication apparatus 151 or an access point 131 to execute data communication. For example, the communication unit 110 can be connected to an access point (not shown) in the communication apparatus 151. The communication unit 110 includes, as an access point in the information processing apparatus 101, an access point for connection to the apparatus such as the communication apparatus 151. This access point is generally called tethering. Note that a communication unit 156 of the communication apparatus 151 can be connected to the access point. When the communication unit 110 enables the access point, the information processing apparatus 101 operates as the access point. When the communication unit 156 and the access point in the communication unit 110 are connected, the information processing apparatus 101 and the communication apparatus 151 can communicate with each other. If the communication unit 110 of the information processing apparatus 101 is connected to the Internet, the communication apparatus 151 can also be connected to the Internet via the information processing apparatus 101. Note that in this embodiment, the information processing apparatus 101 can communicate with the communication apparatus 151 via an external apparatus existing outside the information processing apparatus 101 and the communication apparatus 151. Note that examples of the external apparatus include an external access point (the access point 131 or the like) existing outside the information processing apparatus 101 and the communication apparatus 151, and an apparatus, other than the access point, that can relay communication. For example, a device such as a wireless LAN router is used as the access point 131. The method of connecting the information processing apparatus 101 and the communication apparatus 151 via the external access point is called an infrastructure connection method.

The short distance wireless communication unit 111 is a component wirelessly connected to the apparatus such as the communication apparatus 151 in a short distance to execute data communication, and performs communication by a communication method different from that of the communication unit 110. The short distance wireless communication unit 111 can be connected to a short distance wireless communication unit 157 in the communication apparatus 151. As the communication method, for example, Near Field Communication (NFC), Bluetooth® Classic, Bluetooth Low Energy (BLE), a Wi-Fi Aware, or the like is used.

The communication apparatus 151 includes a ROM 152, a RAM 153, a CPU 154, a print engine 155, the communication unit 156, the short distance wireless communication unit 157, and a display unit 158. The ROM 152, the RAM 153, the CPU 154, and the like form a computer of the communication apparatus 151 for executing a program.

The communication unit 156 includes, as the access point in the communication apparatus 151, an access point for connection to the external apparatus such as the information processing apparatus 101. Note that the access point can be connected to the communication unit 110 of the information processing apparatus 101. If the communication unit 156 enables the access point, the communication apparatus 151 operates as the access point. Note that the communication unit 156 may directly, wirelessly be connected to the information processing apparatus 101 or may wirelessly be connected to the information processing apparatus 101 via the access point 131. The wireless communication method used by the communication unit 156 is, for example, a communication standard based on the IEEE 802.11 series. The communication unit 156 may include a hardware component functioning as an access point or may operate as an access point by software for functioning as an access point.

A mode and a connection method of executing wireless communication using the communication unit 156 will now be described.

<Direct Connection Method>

Direct connection indicates a form in which apparatuses are wirelessly connected directly (that is, by Peer to Peer) without intervention of an external apparatus such as the AP 131. Direct connection is also called Peer to Peer connection (P2P connection). As one connection mode, the communication apparatus 151 can operate in a mode (direct connection mode) for communication by direct connection. In Wi-Fi communication, the mode for communication by direct connection includes a plurality of modes such as a software AP mode and a Wi-Fi Direct (WFD) mode.

A mode in which direct connection is executed by WFD is called a WFD mode. WFD is a standard developed by Wi-Fi Alliance and is a standard included in the IEEE 802.11 communication standards. In the WFD mode, a device serving as a communication partner is searched for by a device search command, then the roles of a P2P group owner (GO) and P2P client are decided, and remaining wireless connection processing is performed. The group owner corresponds to a Wi-Fi master station (master unit), and the client corresponds to a Wi-Fi slave station (slave unit). This role making corresponds to, for example, Go Negotiation in P2P. Note that in the WFD mode in a state before role making is performed, the communication apparatus 151 is neither the master station nor the slave station. More specifically, first, one of devices to communicate with each other issues a device search command and searches for a device to be connected in the WFD mode. After the other device serving as a communication partner is found, the devices confirm information about services and functions that can be supplied by the respective devices. Note that the device supply information confirmation is an option and is not necessary. The device supply information confirmation phase corresponds to, for example, P2P Provision Discovery. Then, the devices confirm the device supply information and decide, as roles, which device serves as a P2P client and which device serves as a P2P group owner. After the client and the group owner are decided, the devices exchange parameters for performing WFD communication. Based on the exchanged parameters, the P2P client and the P2P group owner perform remaining wireless connection processing and IP connection processing. Note that in the WFD mode, the communication apparatus 151 may always operate as the GO without executing the above-described GO Negotiation. That is, the communication apparatus 151 may operate in the WFD mode that is an Autonomous GO mode. The state in which the communication apparatus 151 operates in the WFD mode is, for example, a state in which WFD connection is not established but the communication apparatus 151 operates as the GO, or a state in which WFD connection is established and the communication apparatus 151 operates as the GO.

In the software AP mode, one device (for example, the information processing apparatus 101) among devices (for example, the information processing apparatus 101 and the communication apparatus 151) to communicate with each other serves as a client that plays a role of requesting various services. The other device implements the function of an access point in Wi-Fi by software setting. The software AP corresponds to a Wi-Fi master station, and the client corresponds to a Wi-Fi slave station. In the software AP mode, the client searches for a device serving as a software AP by a device search command. After the software AP is found, the client and the software AP perform remaining wireless connection processing (establishment of wireless connection and the like) and IP connection processing (assignment of an IP address and the like). Note that commands and parameters transmitted/received when implementing wireless connection between the client and the software AP suffice to be those defined by the Wi-Fi standard, and a description thereof will be omitted here.

In this embodiment, in a case where the communication apparatus 151 establishes and maintains direct connection, it operates as a master station in a network to which the communication apparatus 151 belongs. Note that the master station is an apparatus that creates a wireless network, and is an apparatus that provides a slave station with parameters used in connection to the wireless network. The parameters used in connection to the wireless network are, for example, parameters about a channel used by the master station. The slave station receives the parameters and is then connected to the wireless network created by the master station using the channel used by the master station. In the direct connection mode, the communication apparatus 151 operates as the master station and can thus decide a specific frequency band and channel to be used for communication in the direct connection method. In this embodiment, the communication apparatus 151 can use a channel corresponding to the 2.4-GHz frequency band and a channel corresponding to the 5-GHz frequency band for communication in the direct connection method.

<Infrastructure Connection Method>

Infrastructure connection is a connection form in which devices (for example, the information processing apparatus 101 and the communication apparatus 151) to communicate with each other are connected to an access point (for example, the AP 131) that controls a network of the devices, and the devices communicate with each other via the access point. As one connection mode, the communication apparatus 151 can operate in a mode (infrastructure connection mode) for communication by infrastructure connection.

In infrastructure connection, each device searches for an access point by a device search command. After an access point is found, the device and the access point perform remaining wireless connection processing (establishment of wireless connection and the like) and then IP connection processing (assignment of an IP address and the like). Note that commands and parameters transmitted/received when implementing wireless connection between the device and the access point suffice to be those defined by the Wi-Fi standard, and a description thereof will be omitted here.

In this embodiment, when the communication apparatus 151 operates in infrastructure connection, the AP 131 operates as a master station and the communication apparatus 151 operates as a slave station. That is, in this embodiment, infrastructure connection means connection between the communication apparatus 151 operating as a slave unit and the apparatus operating as a master unit. In a case where the communication apparatus 151 establishes infrastructure connection and the information processing apparatus 101 also establishes infrastructure connection to the AP 131, the communication apparatus 151 and the information processing apparatus 101 can communicate with each other via the AP 131. Since the AP 131 decides a channel to be used for communication in infrastructure connection, the communication apparatus 151 executes communication in infrastructure connection using the channel decided by the AP 131. In this embodiment, the communication apparatus 151 can use a channel corresponding to the 2.4-GHz frequency band and a channel corresponding to the 5-GHz frequency band for communication in infrastructure connection. Note that the communication apparatus 151 can also use a channel corresponding to the DFS band in the 5-GHz frequency band for communication in infrastructure connection. Note also that to communicate with the communication apparatus 151 via the AP 131, the information processing apparatus 101 needs to recognize that the communication apparatus 151 belongs to a network which is formed by the AP 131 and to which the information processing apparatus 101 belongs.

<Network Setup Mode>

The communication apparatus 151 can operate in the network setup mode. A trigger for the communication apparatus 151 to start an operation in the network setup mode may be, for example, the pressing of a network setup mode button by the user or activation (power-on) of the communication apparatus 151 for the first time after arrival. The network setup mode button may be a hardware (physical) button of the communication apparatus 151 or a software button displayed on the display unit 158 by the communication apparatus 151.

When the communication apparatus 151 starts an operation in the network setup mode, it enables Wi-Fi communication. More specifically, as Wi-Fi communication enabling processing, the communication apparatus 151 enables an internal AP (connection setting AP) of the communication apparatus 151 that is dedicated to the network setup mode. Then, the communication apparatus 151 can establish Wi-Fi direct connection to the information processing apparatus 101. Assume that connection information (Service Set Identifier (SSID) and password) for connection to the connection setting AP is held in advance in a setup application installed in the information processing apparatus 101, and the information processing apparatus 101 recognizes in advance the connection information for connection to the connection setting AP. Therefore, unlike connection information of an AP enabled in the direct connection mode, the connection information for connection to the connection setting AP cannot be changed arbitrarily by the user. Note that in the network setup mode, the communication apparatus 151 may be connected to the information processing apparatus 101 by not normal Wi-Fi but Wi-Fi Direct (WFD). That is, the communication apparatus 151 may operate as a group owner, and receive a setting command from the information processing apparatus 101 by WFD communication. Alternatively, the communication apparatus 151 may be connected to the information processing apparatus 101 by Bluetooth in the network setup mode. Bluetooth includes Bluetooth Classic and Bluetooth Low Energy (BLE). That is, for example, the communication apparatus 151 may operate as a slave apparatus in BLE in the network setup mode, and receive a setting command from the information processing apparatus 101 by BLE communication. Furthermore, in the network setup mode, the communication apparatus 151 may be able to execute both a network setup by Wi-Fi and a network setup by BLE. That is, when the communication apparatus 151 starts an operation in the network setup mode, it may enable both Wi-Fi communication and BLE communication. More specifically, when the communication apparatus 151 starts an operation in the network setup mode, it may enable both the connection setting AP and an advertising state in which BLE connection is enabled by transmitting advertising information by BLE.

When the communication apparatus 151 operates in the network setup mode, it controls the communication unit 156 to operate as a setup access point (connection setting AP) that is enabled only during an operation in the network setup mode. The setup access point is an access point different from that enabled in the above-described software AP mode. Assume that the SSID of the setup access point includes a predetermined character string recognizable by the setting application of the information processing apparatus 101.

Assume that the communication apparatus 151 operating in the network setup mode uses a predetermined communication protocol (setup communication protocol) in communication with the information processing apparatus 101 connected to the setup access point. More specifically, the setup communication protocol is, for example, Simple Network Management Protocol (SNMP).

If a predetermined time elapses after the communication apparatus 151 starts an operation in the network setup mode, the communication apparatus 151 stops the operation in the network setup mode and disables the setup access point. Furthermore, even when the connection information for connection to the AP 131 and a change instruction of the wireless communication operation mode are received from the information processing apparatus 101 in the network setup mode, the setup access point is disabled. Assume that the setup access point is an access point that does not require a password for connection. Note that the setup access point may be an access point that requires a password. In this case, a password used for connection to the setup access point is a fixed password (unchangeable by the user) that is grasped in advance by the setting application.

The communication unit 156 is assigned with a Media Access Control Address (MAC address). The MAC address is an identifier used to identify the communication unit, and is uniquely assigned to each communication unit in all the apparatuses including the communication apparatus and the information processing apparatus. Therefore, the MAC address is often used to identify the individual apparatus. In this embodiment, the identifier used to identify the apparatus will be referred to as apparatus identification information hereinafter. That is, the MAC address is an example of the apparatus identification information. In this embodiment, the MAC address is used as the apparatus identification information. However, the present invention is not limited to this. For example, a manufacturing number (serial number) assigned to the communication apparatus 151 may be used.

The short distance wireless communication unit 157 is a component wirelessly connected to the apparatus such as the information processing apparatus 101 in a short distance, and can be connected to, for example, the short distance wireless communication unit 111 in the information processing apparatus 101. As the communication method, for example, NFC, Bluetooth Classic, BLE, Wi-Fi Aware, or the like is used.

The RAM 153 is formed by an SRAM or the like, which needs a backup power supply. Note that the RAM 153 can store important data such as program control variables without volatilization because the data are held by a primary battery (not shown) for data backup. In addition, a memory area for storing setting information of the communication apparatus 151, management data of the communication apparatus 151, and the like is also provided in the RAM 153. Furthermore, the RAM 153 is used as the main memory and the work memory of the CPU 154 and a reception buffer to temporarily store print information received from the information processing apparatus 101 or the like or store various kinds of information.

The ROM 152 stores permanent data such as control programs to be executed by the CPU 154, data tables, and an OS program. In this embodiment, the control programs stored in the ROM 152 perform software execution control such as scheduling, task switch, and interrupt processing under the management of the embedded OS stored in the ROM 152. The ROM 152 also stores the serial number for identifying the communication apparatus 151. The serial number is uniquely assigned to identify the communication apparatus 151 by the manufacturer of the communication apparatus 151. In this embodiment, the serial number can also be used as the apparatus identification information that can be used to identify the communication apparatus 151. In a case where the communication apparatus 151 is a printer, the use status and remaining amount of ink are collected from the print engine 155 and stored in the ROM 152. The CPU 154 is a system control unit and controls the whole communication apparatus 151.

Based on information stored in the RAM 153 or a print job received from the information processing apparatus 101 or the like, the print engine 155 forms an image on a print medium such as a paper sheet by applying a printing material such as ink onto the print medium, and outputs the print result. Note that in general, the data amount of the print job transmitted from the information processing apparatus 101 or the like is large, and thus it is necessary to use, for communication of the print job, a communication method that allows high-speed communication. Therefore, the communication apparatus 151 receives the print job via the communication unit 156 that can perform communication at a speed higher than that of the short distance wireless communication unit 157. The display unit 158 is, for example, a panel, and displays data or makes a notification concerning the state of the communication apparatus 151.

Note that a memory such as an external HDD or an SD card may be attached as an optional device to the communication apparatus 151, and information stored in the communication apparatus 151 may be stored in the memory.

An arrangement is assumed in which the identification information (for example, the above-described MAC address) of the communication apparatus 151 is acquired by the information processing apparatus 101 as an apparatus outside the communication apparatus 151. In this arrangement, for example, the information processing apparatus 101 manages the information of the communication apparatus 151 in linkage with the MAC address of the communication apparatus 151. On the other hand, there is known a technique for randomizing the identification information of the communication apparatus 151 such as the MAC address randomization technique. However, if the MAC address is randomized while the information of the communication apparatus 151 is managed, even if the information processing apparatus 101 acquires the randomized identification information, the information processing apparatus 101 cannot appropriately manage the information of the communication apparatus 151.

To cope with this, in this embodiment, the information processing apparatus 101 can acquire the identification information of the communication apparatus 151 before randomization. This allows the information processing apparatus 101 to appropriately manage the information of the communication apparatus 151. Note that in this embodiment, as the communication apparatus 151, there exist an apparatus supporting a MAC address randomization function and an apparatus not supporting the MAC address randomization function. The MAC address randomization function is a function set by Institute of Electrical and Electronics Engineers (IEEE), and is a function of assigning, to an apparatus, a MAC address generated in accordance with the rule set by IEEE. A MAC address generated as a random value by the MAC address randomization function will be referred to as a random MAC address hereinafter. A MAC address of a fixed value that is not randomly generated by the MAC address randomization function and is not changed will be referred to as a fixed MAC address hereinafter. Then, the apparatus supporting the MAC address randomization function is an apparatus of a newer model (model number), and the apparatus not supporting the MAC address randomization function is an apparatus of an older model.

The apparatus supporting the MAC address randomization function can execute setting of whether to enable the MAC address randomization function. Then, the communication apparatus 151 which supports the MAC address randomization function and in which the MAC address randomization function is enabled provides a random MAC address to an external apparatus. That is, the random MAC address is used as the MAC address assigned to the communication unit 156 of the communication apparatus 151. Note that if the MAC address randomization function is enabled, the MAC address assigned to the communication unit 156 of the communication apparatus 151 is periodically changed. The changed MAC address is also generated as a random value by the MAC address randomization function. The communication apparatus 151 which supports the MAC address randomization function and in which the MAC address randomization function is not enabled provides a fixed MAC address. The communication apparatus 151 which does not support the MAC address randomization function also provides a fixed MAC address to an external apparatus. That is, the fixed MAC address is used as the MAC address assigned to the communication unit 156 of the communication apparatus 151.

Note that the MAC address assigned to the communication unit 156 of the communication apparatus 151 includes information indicating the random MAC address. The MAC address is represented by alphanumeric characters indicating 12 hexadecimal digits and a delimiter such as ":" (for example, 1A:2B:3C:4D:5E:6F). The two alphanumeric characters, divided by the delimiter, of the MAC address is called an octet. A MAC address in which the second bit is 1 when the value of the first octet (in the above example, 1A) is represented in binary is defined as a random MAC address by IEEE. Note that more specifically, the MAC address in which the second bit is 1 when the value of the first octet is represented in binary is, for example, a MAC address in which the value of the first octet ends with one of values of 2, 6, A, and E. Since the random MAC address is defined as described above, the fixed MAC address is a MAC address in which the value of the first octet ends with a value other than 2, 6, A, and E.

FIG. 2 is a view showing an example of a user interface screen of the printer management application operating on the information processing apparatus 101. The printer management application is software for setting the communication apparatus 151 and the information processing apparatus 101 to be able to communicate with each other, and can perform basic setting concerning a network, such as an IP address. Furthermore, the printer management application has a printer management function as one function, and manages the information of the communication apparatus 151 acquired from the communication apparatus 151.

The printer management application displays a printer management information list screen 201 on the display unit 108. The printer management information list screen 201 displays a list of communication apparatuses 151 whose management information has been acquired via the communication unit 110 in the past. Items of the management information are displayed in a printer management information item display area 202. As an example, a MAC address, a model name, an installation place, a state, an IP address, a port name, a firmware version, and a connection SSID are displayed. However, the items of the management information are not limited to those shown in FIG. 2. For example, items of consumable information such as the remaining amount of ink and the state of a waste ink tank and other items may be displayed.

The management information of each communication apparatus 151 is displayed in a printer management information display area 203. If the information processing apparatus 101 cannot acquire the management information because the information processing apparatus 101 and the communication apparatus 151 are in an offline state, the latest management information acquired in the past is displayed.

When the user presses a printer management information update button 204, update processing of the management information of each communication apparatus 151 is executed. The update processing indicates, for example, reacquisition of the management information from the communication apparatus 151. When the update processing is executed, the latest management information is displayed in the printer management information display area 203. Furthermore, the printer management application may have a function of referring to the history of management information records acquired in the past.

FIG. 3 is a flowchart illustrating processing of updating the management information on the printer management information list screen 201. The processing shown in FIG. 3 is implemented when, for example, the CPU 103 reads out a program stored in the ROM 104 to the RAM 105 and executes the readout program. The processing shown in FIG. 3 is started when, for example, an activation instruction of the printer management application or the pressing of the printer management information update button 204 is accepted. Then, by the processing of FIG. 3, the printer management information list screen 201 is displayed. Note that before the start of the processing of FIG. 3, the management information managed by the printer management application already exists. Assume here that the management information shown in FIG. 2 is already managed. A MAC address ("XXXX", "YYYY", or "ZZZZ" in FIG. 2) included in such management information is the above-described fixed MAC address or the MAC address before randomization. The MAC address before randomization, which is held in the apparatus when the MAC address is randomized by the randomization function, will specifically be referred to as an "original MAC address" hereinafter. In other words, the MAC address before randomization by the MAC address randomization function is a MAC address that is not randomized by the MAC address randomization function.

In step S101, the CPU 103 communicates with the communication apparatus 151 to acquire the MAC address. If the information processing apparatus 101 can communicate with the plurality of managed communication apparatuses 151, the CPU 103 acquires the MAC address from each of the plurality of communication apparatuses 151. In this case, the CPU 103 may communicate with each communication apparatus 151 by unicast, or communicate with the plurality of communication apparatuses 151 by broadcast or multicast. A communication protocol is not limited. For example, an application layer protocol such as SNMP or Hyper Text Transfer Protocol (HTTP) may be used, or a data link layer protocol may be used in the case of P2P connection. A communication interface may be the communication unit 110 or the short distance wireless communication unit 111 such as Bluetooth. Furthermore, in step S101, information used for determination in step S102 may be acquired in addition to the MAC address.

In step S102, the CPU 103 determines whether the MAC address acquired in step S101 is a randomized MAC address. The CPU 103 may perform the determination processing based on, for example, a bit in the MAC address, which is 1 in the case where the MAC address is randomized. The determination processing of whether the MAC address is randomized may be performed by another method. For example, the above determination processing may be performed based on whether it is possible to acquire the original MAC address before the MAC address is randomized. If, for example, the communication apparatus 151 randomizes the MAC address, an Object Identifier (OID) that stores the original MAC address is provided in a Management Information Base (MIB). Then, if information is empty or error when an attempt is made to acquire the MAC address by the OID in step S101, it may be determined that the MAC address is not randomized. The determination processing in step S102 may be performed based on whether there is a difference between the MAC address managed by the information processing apparatus 101 and the MAC address acquired in step S101. In this case, if there is no difference, it may be determined that the MAC address is not randomized. Alternatively, the determination processing in step S102 may be performed based on information with which it is possible to determine whether the MAC address is randomized and which is acquired from the communication apparatus 151 in step S101. For example, an OID indicating ON/OFF of MAC address randomization is provided in the MIB of the communication apparatus 151. If information acquired by designating the OID in step S101 is OFF, it may be determined that the MAC address is not randomized.

If it is determined in step S102 that the MAC address is not randomized, the CPU 103 acquires, in step S103, the management information of the communication apparatus 151 from the communication apparatus 151 corresponding to the MAC address acquired in step S101. The management information that can be acquired is, for example, information of items such as the MAC address, the model name, the installation place, the state, the IP address, the port name, the firmware version, and the connection SSID displayed on the printer management information list screen 201 of FIG. 2. The management information is acquired by, for example, SNMP. If the plurality of communication apparatuses 151 are managed, the CPU 103 may communicate with the plurality of communication apparatuses 151 to acquire the management information of each communication apparatus 151.

In step S104, the CPU 103 updates, among pieces of stored management information, management information linked with MAC address acquired in step S101 to the management information acquired in step S103. If the plurality of communication apparatuses 151 are managed, the pieces of management information of the plurality of communication apparatuses 151 may be updated. Note that the management information may be stored in a database or the like, and the MAC address may be used as a primary key. The MAC address may be used as one item of a composite primary key. The MAC address may be used as a foreign key. Part of the MAC address may be used as a key. A hash value of information including the MAC address may be used as a key. The timing of the processing of step S103 need not be the timing shown in FIG. 3. For example, the processing of step S103 may be executed in step S101. In step S104, in addition to update of the stored management information, new management information may be added.

In step S105, the CPU 103 displays the printer management information list screen 201. After that, the CPU 103 ends the processing shown in FIG. 3.

A list of the communication apparatuses 151 whose management information has been acquired in the past is displayed on the printer management information list screen 201. The management information of each communication apparatus 151 is displayed in the printer management information display area 203. Note that if it is impossible to acquire the management information from the communication apparatus 151 because of the offline state, the latest management information acquired in the past is displayed. Contents displayed in step S105 are not limited to display contents shown in FIG. 2. Furthermore, if a selection operation of a row of printer management information is accepted in the printer management information display area 203, detailed information of the selected printer may be displayed on another screen. In addition, a function of displaying a history of a plurality of pieces of management information acquired in the past with respect to the selected printer may be held.

If it is determined in step S102 that the MAC address is randomized, the CPU 103 acquires, in step S106, the original MAC address from the communication apparatus 151. In this embodiment, an OID that stores the original MAC address is provided in a MIB. The MIB formed here may be a standard MIB such as a printer MIB or a private MIB originally defined by the vendor. In step S106, the CPU 103 acquires the original MAC address using, for example, Get-Request as a MIB acquisition command. If the plurality of communication apparatuses 151 are managed, the CPU 103 may communicate with the plurality of communication apparatuses 151 to acquire the original MAC address of each communication apparatus 151 in step S106.

In step S107, the CPU 103 acquires the management information of the communication apparatus 151 from the communication apparatus 151 from which the original MAC address is acquired in step S106. The management information that can be acquired is, for example, information of items such as the MAC address, the model name, the installation place, the state, the IP address, the port name, the firmware version, and the connection SSID displayed on the printer management information list screen 201 of FIG. 2. The management information is acquired by, for example, SNMP. If the plurality of communication apparatuses 151 are managed, the CPU 103 may communicate with the plurality of communication apparatuses 151 to acquire the management information of each communication apparatus 151. The timing of the processing of step S107 need not be the timing shown in FIG. 3. For example, the processing of step S107 may be executed in step S101.

In step S108, the CPU 103 specifies, among the pieces of management information acquired in step S107, the management information corresponding to the original MAC address acquired in step S106 and matching the MAC address linked with the management information stored by the printer management application. Then, the CPU 103 updates the management information stored by the printer management application to the specified management information. If the plurality of communication apparatuses 151 are managed, the pieces of management information of the plurality of communication apparatuses 151 may be updated.

If the MAC address is used as a key, a database key or table may be updated to another identifier in step S108. For example, a key for which the randomized MAC address is used may be updated to another kind of identifier such as a serial number, and an item indicating a state in which the MAC address is randomized may be added as a new column to the database. After step S108, the process advances to step S105 described above.

In this embodiment, FIG. 5 has been explained as processing up to display of the printer management information list screen 201 based on acceptance of an instruction to update the printer management information. However, the display processing need not be performed. That is, the update processing of the printer management information may be executed in the background without performing the display processing in step S105. Then, another application may refer to the management information.

Figure 4:
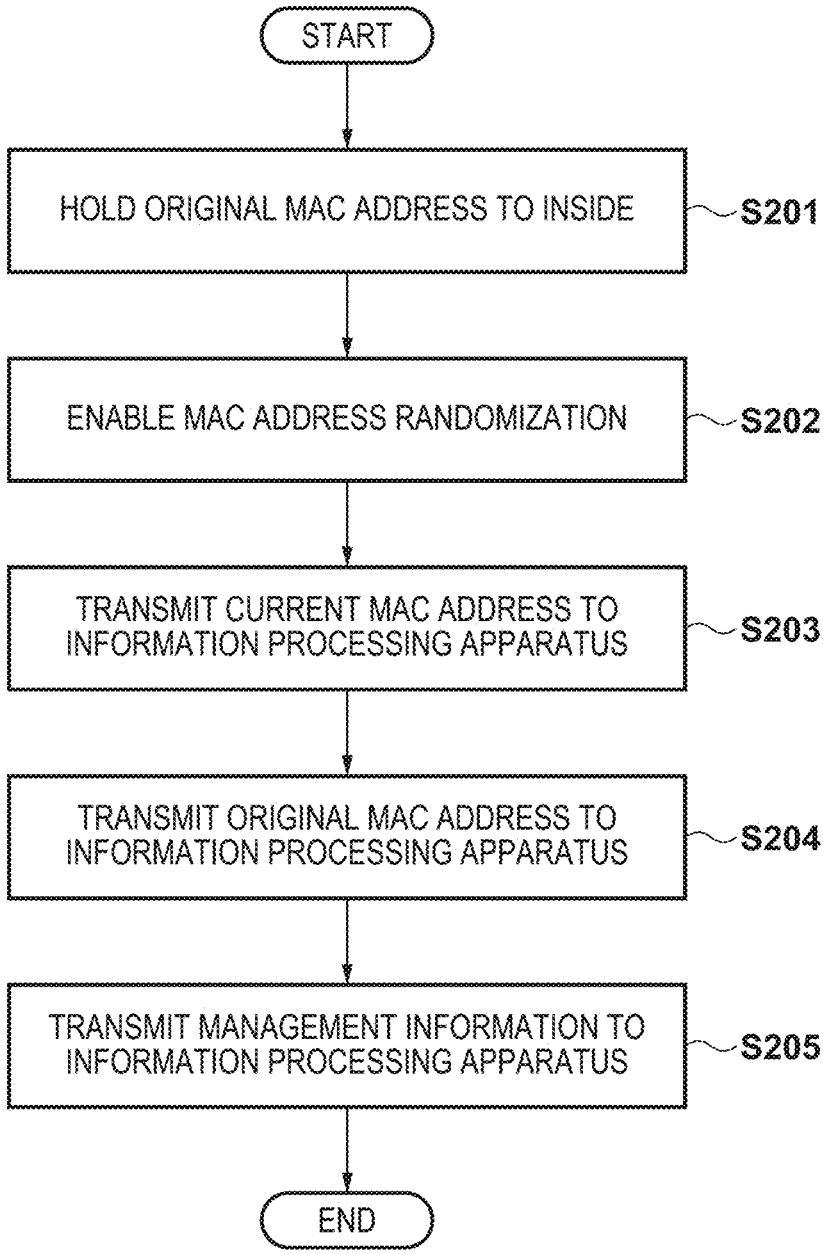
FIG. 4 is a flowchart illustrating processing executed by the communication apparatus.

FIG. 4 is a flowchart illustrating processing in which the communication apparatus 151 transmits information to the information processing apparatus 101. The processing shown in FIG. 4 is implemented when, for example, the CPU 154 reads out a program stored in the ROM 152 to the RAM 153 and executes the readout program. Note that the processing shown in FIG. 4 is executed in a case where the MAC address is randomized.

In step S201, the CPU 154 holds the original MAC address at the time of activation of the information processing apparatus 101. For example, the CPU 154 stores the original MAC address in the OID, that stores the original MAC address, of the MIB of the communication apparatus 151. Note that if the original MAC address is already stored, the processing of step S201 need not be performed. The original MAC address may be held when the MAC address is randomized.

In step S202, the CPU 154 enables MAC address randomization. For example, an operation of enabling MAC address randomization of the communication apparatus 151 is accepted via a touch panel or a button of the main body of the communication apparatus 151. Based on the accepted operation, the CPU 154 enables MAC address randomization. Note that the operation of enabling MAC address randomization may be performed remotely by, for example, receiving information from an external apparatus such as the information processing apparatus 101.

In step S203, the CPU 154 transmits, to the information processing apparatus 101, the current MAC address assigned to the communication unit 156, that is, the randomized MAC address. The processing of step S203 may be executed in correspondence with the processing of step S101 or may be executed by using the processing of step S202 as a trigger. Furthermore, the transmission processing of step S203 may be performed by a method of transmitting the MAC address by including it in a Beacon of Wi-Fi communication.

In step S204, the CPU 154 transmits the original MAC address to the information processing apparatus 101. The processing of step S204 may be executed in correspondence with step S106. For example, upon receiving a Get-Request command from the information processing apparatus 101, the CPU 154 may transmit the original MAC address stored in the OID of the MIB to the information processing apparatus 101. The original MAC address may be transmitted with reference to the memory that stores the original MAC address.

In step S205, the CPU 154 transmits the management information of the communication apparatus 151 to the information processing apparatus 101. The processing of step S205 may be executed in correspondence with step S107. For example, upon receiving the command from the information processing apparatus 101 by SNMP, the CPU 154 may transmit the management information to the information processing apparatus 101. After step S205, the processing shown in FIG. 4 ends.

The transmission timing of each of the pieces of information including the randomized MAC address, the original MAC address, and the management information is not limited to the example shown in FIG. 4. For example, the transmission timings in steps S203 and S204 may be different from the example shown in FIG. 4. Alternatively, these pieces of information may be transmitted simultaneously in association with each other.

As described above, according to this embodiment, if it is determined that the MAC address acquired from the communication apparatus 151 is the randomized MAC address, the original MAC address before randomization is acquired from the communication apparatus 151. This can appropriately manage the management information linked with the MAC address in the communication apparatus 151.

Second Embodiment

The second embodiment will be described below concerning points different from the first embodiment. This embodiment will describe an arrangement in which an original MAC address is encrypted by a cryptographic protocol, and transmitted to an information processing apparatus 101. In this arrangement, it is possible to prevent information of an original MAC address from being intercepted by the third party, thereby protecting user privacy.

FIG. 5 is a flowchart illustrating processing of updating management information on a printer management information list screen 201. The processing shown in FIG. 5 is implemented when, for example, a CPU 103 reads out a program stored in a ROM 104 to a RAM 105 and executes the readout program. Steps S301 to S305 and S307 to S309 of FIG. 5 are the same as steps S101 to S105 and S106 to S108 of FIG. 3 and a description thereof will be omitted. Note that in steps S307 and S308, an original MAC address and management information transmitted from a communication apparatus 151 have been encrypted. Therefore, in steps S307 and S308, the CPU 103 decrypts the original MAC address and the management information.

If it is determined that the MAC address acquired in step S301 is the randomized MAC address, the CPU 103 determines in step S306 whether encrypted communication is set between the information processing apparatus 101 and the communication apparatus 151. The determination processing of step S301 may be performed based on, for example, the network setting between the information processing apparatus 101 and the communication apparatus 151. For example, if SSL (TLS) encrypted communication is set, a common key usable between the information processing apparatus 101 and the communication apparatus 151 is generated using a server certificate and a public key between these apparatuses, and encrypted communication is implemented by the common key. Note that SSL is an abbreviation for Secure Socket Layer and TLS is an abbreviation for Transport Layer Security.

If it is determined in step S306 that encrypted communication is set, the processes of steps S307 to S309 and S305 are executed; otherwise, the process advances to step S310.

In step S310, the CPU 103 sets encrypted communication between the information processing apparatus 101 and the communication apparatus 151. The processing of step S310 may be executed by displaying a guidance for prompting the user to set encrypted communication or may be executed to set encrypted communication without accepting a user operation. Then, in step S310, the CPU 103 acquires the original MAC address from the communication apparatus 151. At this time, the original MAC address is encrypted by the setting in step S310. After that, the processes of steps S308, S309, and S305 are executed. Note that since encrypted communication is set in step S310, encrypted communication is also executed in the subsequent processing. However, when the processing of FIG. 5 ends, the setting of encrypted communication set in step S310 may be canceled, and a message concerning the cancellation of the setting of encrypted communication may be displayed to the user at this time. The timing of canceling the setting of encrypted communication may be a timing before the end of the processing shown in FIG. 5, and may be, for example, a timing at which the processing of step S308 ends.

The determination processing of step S306 is not limited to the timing shown in FIG. 5, and may be executed, for example, before step S301. In this case, if it is determined that encrypted communication is set, communication between the information processing apparatus 101 and the communication apparatus 151 is encrypted in the processing shown in FIG. 5. Instead of the determination processing of step S306, encrypted communication between the information processing apparatus 101 and the communication apparatus 151 may be set before the start of the processing shown in FIG. 5. In this case, a user operation may be accepted, or encrypted communication may be set without accepting a user operation.

As described above, according to this embodiment, the original MAC address acquired from the communication apparatus 151 can be acquired by encrypted communication. In this arrangement, it is possible to prevent information of the original MAC address from being intercepted by the third party, thereby protecting user privacy.

Third Embodiment

Points different from the first and second embodiments will be described below. In this embodiment, a hash value of information including an original MAC address is communicated between an information processing apparatus 101 and a communication apparatus 151 instead of the original MAC address. In this arrangement, it is possible to appropriately manage management information without communicating the original MAC address itself.

Figure 6:
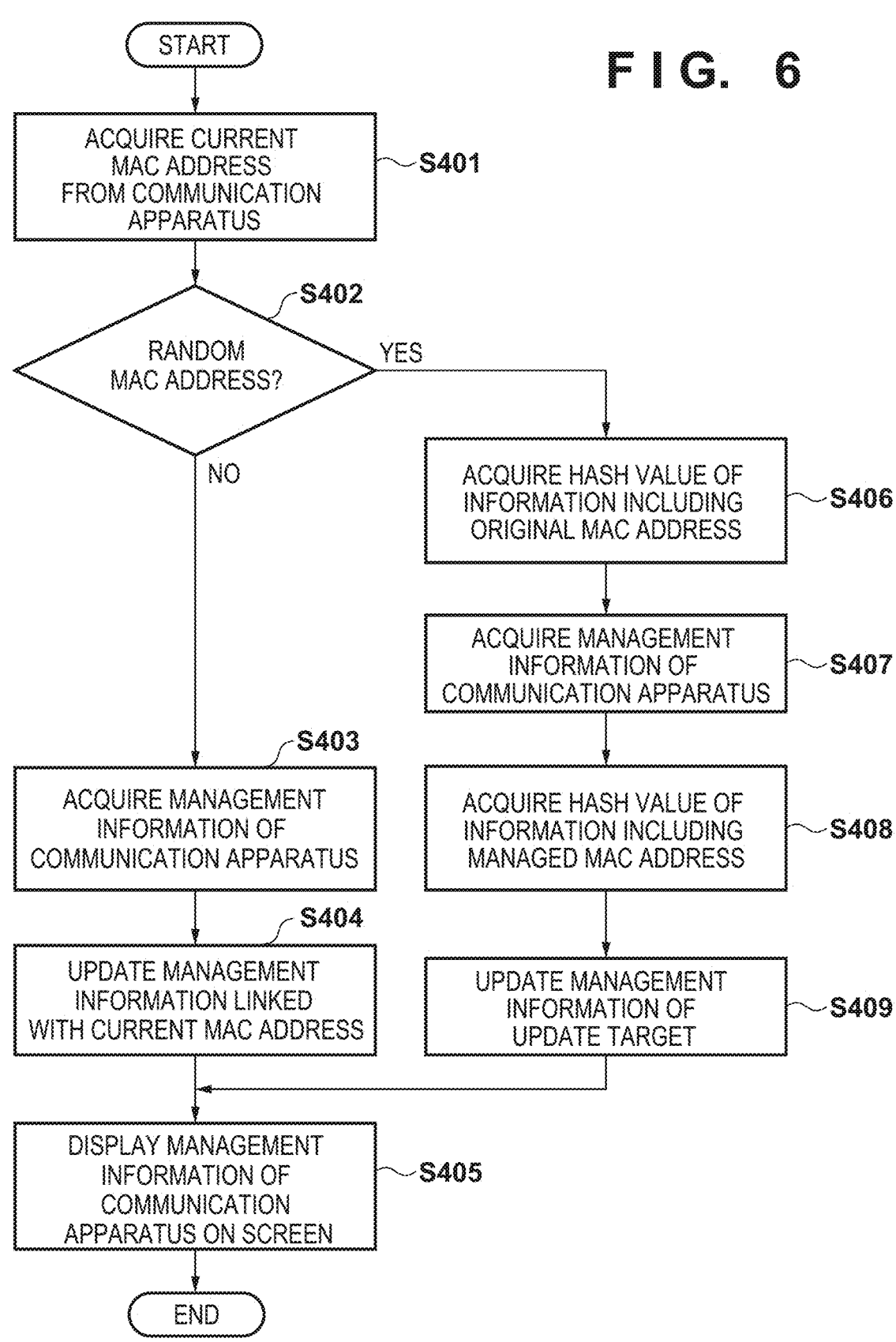
FIG. 6 is a flowchart illustrating processing executed by an information processing apparatus.

FIG. 6 is a flowchart illustrating processing of updating management information on a printer management information list screen 201. The processing shown in FIG. 6 is implemented when, for example, a CPU 103 reads out a program stored in a ROM 104 to a RAM 105 and executes the readout program. Steps S401 to S405 of FIG. 6 are the same as steps S101 to S105 of FIG. 3 and a description thereof will be omitted.

If it is determined that a MAC address acquired in step S401 is a randomized MAC address, the CPU 103 requests and acquires, in step S406, a hash value of information including an original MAC address from the communication apparatus 151. For example, the CPU 103 requests and acquires, from the communication apparatus 151, a hash value of data obtained by combining the original MAC address and the randomized MAC address transmitted to the information processing apparatus 101 in step S401. Note that both the information processing apparatus 101 and the communication apparatus 151 know a hash value generation method, that is, a hash function.

In step S407, the CPU 103 acquires the management information of the communication apparatus 151 from the communication apparatus 151. The management information that can be acquired is, for example, information of items such as a MAC address, model name, an installation place, a state, an IP address, a port name, a firmware version, and a connection SSID displayed on the printer management information list screen 201 of FIG. 2. The management information is acquired by, for example, SNMP. If a plurality of communication apparatuses 151 are managed, the CPU 103 may communicate with the plurality of communication apparatuses 151 to acquire the management information of each communication apparatus 151. Note that the management information acquired in step S407 is stored in association with the hash value acquired from the communication apparatus 151 in step S406.

In step S408, the CPU 103 acquires a hash value of data obtained by combining a MAC address stored by a printer management application and the randomized MAC address acquired in step S401. Note that in calculation of a hash value, the same method as the method of calculating the hash value by the communication apparatus 151 is used. If a plurality of randomized MAC addresses are acquired in step S401, the stored MAC address is combined with each randomized MAC address. Then, among the hash values acquired from the communication apparatuses 151 in step S406, the CPU 103 specifies a hash value equal to the hash value acquired based on the MAC address stored by the printer management application.

In step S409, the CPU 103 updates the management information stored by the printer management application to management information corresponding to the specified hash value. After step S409, the process advances to step S405.

This embodiment has explained acquisition, from the communication apparatus 151, of a hash value of data obtained by combining the original MAC address and the randomized MAC address transmitted to the information processing apparatus 101 in step S401. In this embodiment, the hash value is used by the printer management application to identify the management information of the communication apparatus 151. Therefore, data to be combined with the original MAC address is not limited to the randomized MAC address, and any data that can be referred to by both the printer management application and the communication apparatus 151 may be used. Thus, data to be combined with the original MAC address may separately be communicated between the communication apparatus 151 and the information processing apparatus 101. Alternatively, the communication apparatus 151 may calculate a hash value only from the original MAC address. In this case, in step S408, the information processing apparatus 101 calculates a hash value only from the MAC address stored by the printer management application.

This embodiment assumes that both the communication apparatus 151 and the information processing apparatus 101 know a method of combining data and a method of calculating a hash value. However, information concerning a method of combining data and a method of calculating a hash value may separately be communicated between the communication apparatus 151 and the information processing apparatus 101.

As described above, according to this embodiment, a hash value of information including an original MAC address is communicated between the information processing apparatus 101 and the communication apparatus 151 instead of the original MAC address. In this arrangement, it is possible to appropriately manage the management information without communicating the original MAC address itself.

Fourth Embodiment

The fourth embodiment will be described below concerning points different from the first to third embodiments. In this embodiment, a kind of information different from an original MAC address can be used as the identifier of a communication apparatus.

Figure 7:
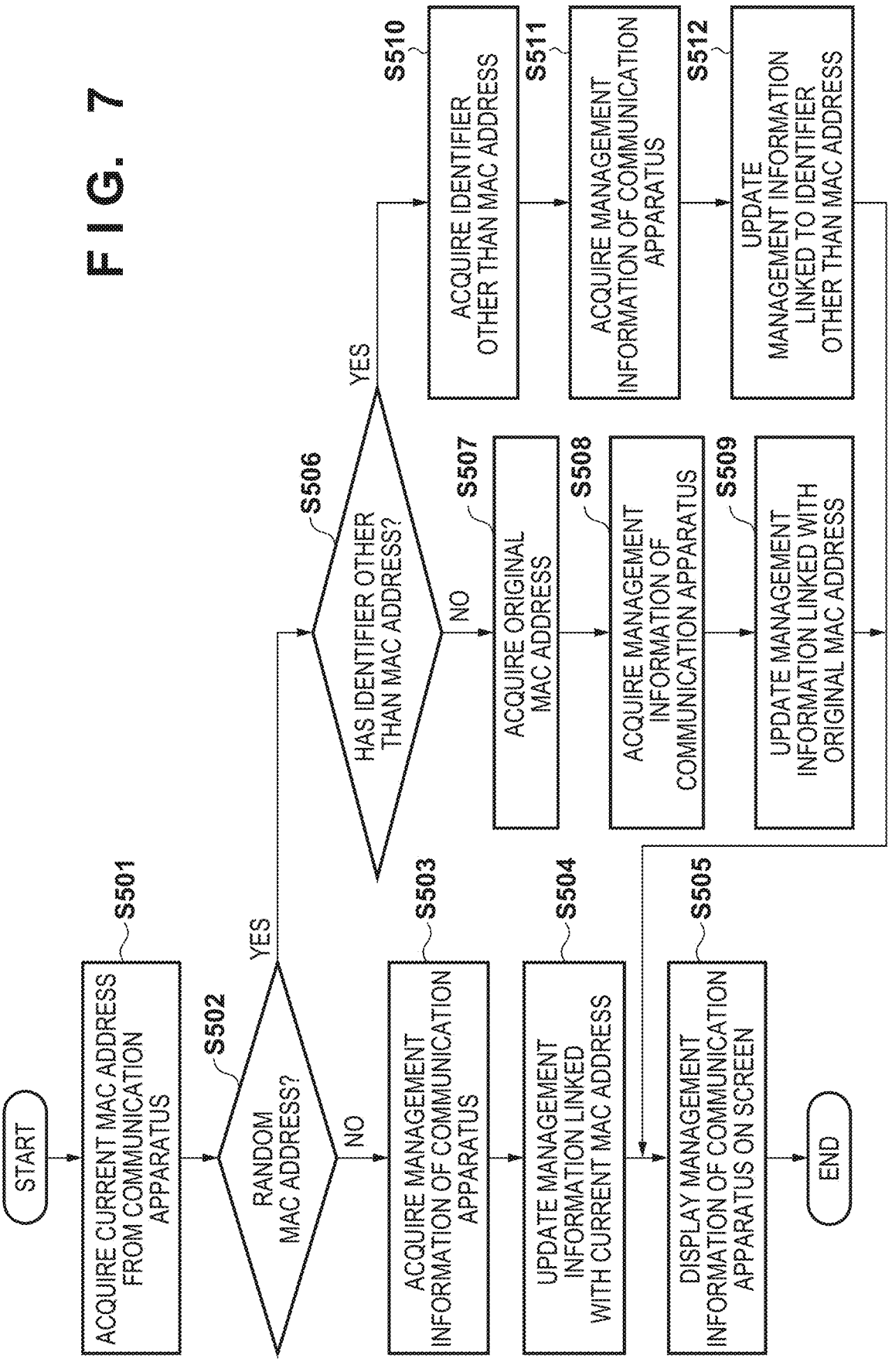
FIG. 7 is a flowchart illustrating processing executed by an information processing apparatus.

FIG. 7 is a flowchart illustrating processing of updating management information on a printer management information list screen 201. The processing shown in FIG. 7 is implemented when, for example, a CPU 103 reads out a program stored in a ROM 104 to a RAM 105 and executes the readout program. Steps S501 to S505 and S507 to S509 of FIG. 7 are the same as steps S101 to S105 and S106 to S108 of FIG. 3 and a description thereof will be omitted.

If it is determined that a MAC address acquired in step S501 is a randomized MAC address, the CPU 103 determines, in step S506, whether a communication apparatus 151 corresponding to management information stored by a printer management application is an apparatus having an identifier (to be referred to as the second identifier) for uniquely identifying the communication apparatus 151 other than a MAC address. In this embodiment, the second identifier is, for example, a serial number. For example, if model information (model name or the like) indicates an inkjet printer, the communication apparatus 151 is determined to have the second identifier. For example, if the model information (model name or the like) indicates a laser printer, the communication apparatus 151 is determined not to have the second identifier. In this embodiment, the second identifier may be one piece of management information, or may be stored as information other than management information in an information processing apparatus 101 in linkage with the management information. If it is determined in step S506 that the communication apparatus 151 is not an apparatus having the second identifier, the processes of steps S507 to S509 and S505 are executed. That is, an original MAC address is acquired from the communication apparatus

151 corresponding to the random MAC address, and management information linked with the original MAC address is updated.

On the other hand, if it is determined in step S506 that the communication apparatus 151 is an apparatus having the second identifier, the CPU 103 acquires the second identifier, for example, a serial number from the communication apparatus 151 of the random MAC address in step S510. Note that in step S510, the second identifier may be acquired by encrypted communication, similar to the second embodiment. Alternatively, a hash value of information including the second identifier may be acquired instead of the second identifier itself, similar to the third embodiment. Note that in step S510, the second identifiers may be acquired from a plurality of communication apparatuses 151.

In step S511, the CPU 103 specifies, among the second identifiers acquired in step S510, the same identifier as the second identifier of the communication apparatus 151 corresponding to the management information stored by the printer management application. Then, the CPU 103 acquires the management information of the communication apparatus 151 from the specified communication apparatus 151. The management information that can be acquired is, for example, information of items such as a MAC address, a model name, an installation place, a state, an IP address, a port name, a firmware version, and a connection SSID displayed on the printer management information list screen 201 of FIG. 2.

In step S512, the CPU 103 updates the management information stored by the printer management application to the management information acquired in correspondence with the second identifier specified in step S511. After that, the processing of step S505 is executed.

In FIG. 7, the second identifier is acquired at the timing of step S510. However, the second identifier may be acquired at another timing. For example, the second identifier may be acquired together with the management information of the communication apparatus 151.

As described above, according to this embodiment, it is possible to acquire the second identifier such as a serial number from the communication apparatus having the second identifier other than a MAC address, and appropriately manage the management information of the communication apparatus.

OTHER EMBODIMENTS

In the above-described embodiments, the CPU 103 determines whether the MAC address acquired from the communication apparatus 151 is a randomized MAC address, and branches the processing in accordance with the determination result. However, the present invention is not limited to this. For example, instead of acquiring the MAC address from the communication apparatus 151, the CPU 103 may acquire, from the communication apparatus 151, information representing whether the MAC address randomization function is enabled in the communication apparatus 151. Then, it may be determined based on the information whether the MAC address randomization function is enabled in the communication apparatus 151, and processing may be branched in accordance with the determination result. In this form, after the determination processing, non-randomized identification information (a MAC address, a hash value of a MAC address, a serial number, or the like) is appropriately acquired from the communication apparatus 151. Note that a case where the MAC address acquired from the communication apparatus 151 is a randomized MAC address is a case where the MAC address randomization function is enabled in the communication apparatus 151. A case where the above information represents that the MAC address randomization function is enabled in the communication apparatus 151 is a case where the MAC address randomization function is enabled in the communication apparatus 151. Therefore, either of the above determination processes can be said as processing of determining whether the MAC address randomization function is enabled in the communication apparatus 151.

In the above-described embodiments, the form in which an original MAC address is acquired and the original MAC address and the management information are managed in linkage with each other in a case where the MAC address randomization function is not enabled in the communication apparatus 151 has been explained. However, the application purpose of the acquired original MAC address is not limited to this form. For example, after acquiring the original MAC address, the information processing apparatus 101 can appropriately communicate with the communication apparatus 151. More specifically, for example, the information processing apparatus 101 can transmit a print job to the communication apparatus 151. Then, when making an attempt to execute some communication with the communication apparatus 151, the information processing apparatus 101 needs to search for and find the communication apparatus 151 on a network to which the information processing apparatus 101 belongs. Therefore, for example, the information processing apparatus 101 may use the acquired original MAC address to search for and find the communication apparatus 151 on the network to which the information processing apparatus 101 belongs.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-078696, filed May 11, 2023, which is hereby incorporated by reference herein in its entirety.

What is claimed is:

1. A method for controlling an information processing apparatus, the method comprising:

acquiring predetermined information from a communication apparatus;

determining that the acquired predetermined information is information corresponding to enabling of a predetermined function of randomizing identification information of the communication apparatus in the communication apparatus;

upon determining that the acquired predetermined information is information corresponding to the enabling of the predetermined function of randomizing identification information of the communication apparatus in the communication apparatus, acquiring identification information that is not randomized by the predetermined function from the communication apparatus that has transmitted the predetermined information to the information processing apparatus; and executing processing based on the acquired identification information that is not randomized by the predetermined function.

2. The method according to claim 1, wherein the predetermined information is the identification information of the communication apparatus, and the determining determines that the acquired predetermined information is the information corresponding to enabling of the predetermined function in the communication apparatus when the acquired predetermined information is identification information that is randomized by the predetermined function.

3. The method according to claim 1, wherein the predetermined information is information representing whether the predetermined function is enabled in the communication apparatus, and the determining determines that the predetermined information is the information corresponding to enabling of the predetermined function in the communication apparatus when the acquired predetermined information indicates that the predetermined function is enabled in the communication apparatus.

4. The method according to claim 1, further comprising acquiring management information from the communication apparatus, wherein the processing based on the acquired identification information that is not randomized by the predetermined function is processing of storing, in a storage device, the management information and the identification information that is not randomized by the predetermined function in linkage with each other.

5. The method according to claim 1, further comprising searching for the communication apparatus on a network, to which the information processing apparatus belongs, by using the identification information that is not randomized by the predetermined function, in a case where the acquired predetermined information is the information corresponding to enabling of the predetermined function in the communication apparatus.

6. The method according to claim 1, wherein the identification information that is not randomized by the predetermined function is acquired by transmitting information for designating a location where the identification information that is not randomized by the predetermined function is stored in the communication apparatus.

7. The method according to claim 6, wherein the information for designating the location where the identification information is stored is an Object Identifier (OID) in a Management Information Base (MIB).

8. The method according to claim 1, wherein when it is determined that the acquired predetermined information is the information corresponding to enabling of the predetermined function in the communication apparatus, one of first identification information that is the same kind of identification information as the identification information randomized by the predetermined function and is not randomized by the predetermined function and second identification information that is a kind of identification information different from the identification information randomized by the predetermined function and is not randomized by the predetermined function is acquired.

9. The method according to claim 8, wherein in a case where it is determined that the acquired predetermined information is the information corresponding to enabling of the predetermined function in the communication apparatus and the communication apparatus as an acquisition source of the predetermined information is of a first model, the first identification information is acquired, and in a case where it is determined that the acquired predetermined information is the information corresponding to enabling of the predetermined function in the communication apparatus and the communication apparatus as the acquisition source of the predetermined information is of a second model different from the first model, the second identification information is acquired.

10. The method according to claim 9, wherein the first model is a laser beam printer and the second model is an inkjet printer.

11. The method according to claim 8, wherein the first identification information is a MAC address and the second identification information is a serial number.

12. The method according to claim 1, wherein the identification information that is not randomized by the predetermined function is acquired via encrypted communication.

13. The method according to claim 1, wherein the identification information that is not randomized by the predetermined function is a hash value.

14. The method according to claim 4, wherein the management information includes at least one of an installation place, a state, an IP address, a port name, a firmware version, and a Service Set Identifier (SSID).

15. The method according to claim 1, wherein the predetermined information is identification information of the communication apparatus, and in a case where the acquired predetermined information is information corresponding to non-enabling of the predetermined function in the communication apparatus, processing based on the predetermined information is executed as the processing based on the identification information that is not randomized by the predetermined function.

16. The method according to claim 1, wherein the predetermined information is information representing whether the predetermined function is enabled in the communication apparatus, and in a case where the acquired predetermined information is information corresponding to non-enabling of the predetermined function in the communication apparatus, the identification information that is not randomized by the predetermined function is acquired and the processing based on the identification information that is not randomized by the predetermined function is executed.

17. The method according to claim 1, wherein the predetermined function is a MAC address randomization function.

18. An information processing apparatus comprising:

an interface to communicate with a communication apparatus;

at least one memory storing instructions; and at least one processor that, upon execution of the stored instructions, causes the information processing apparatus to:

acquire predetermined information from the communication apparatus;

determine that the predetermined information acquired from the communication apparatus is information corresponding to enabling of a predetermined function of randomizing identification information of the communication apparatus in the communication apparatus;

upon determining that the acquired predetermined information is information corresponding to the enabling of the predetermined function of randomizing identification information of the communication apparatus in the communication apparatus, acquire identification information that is not randomized by the predetermined function from the communication apparatus that has transmitted the predetermined information to the information processing apparatus; and execute processing based on the identification information that is not randomized by the predetermined function and is acquired from the communication apparatus.

19. A non-transitory computer-readable storage medium storing a program causing a computer of an information processing apparatus to:

acquire predetermined information from a communication apparatus;

determine that the acquired predetermined information is information corresponding to enabling of a predetermined function of randomizing identification information of the communication apparatus in the communication apparatus;

upon determining that the acquired predetermined information is information corresponding to the enabling of the predetermined function of randomizing identification information of the communication apparatus in the communication apparatus, acquire identification information that is not randomized by the predetermined function from the communication apparatus that has transmitted the predetermined information to the information processing apparatus; and execute processing based on the acquired identification information that is not randomized by the predetermined function.

* * * * *